US007974641B2

(12) United States Patent
Inukai

(10) Patent No.: US 7,974,641 B2
(45) Date of Patent: Jul. 5, 2011

(54) COMMUNICATION TERMINAL APPARATUS AND COMPUTER PROGRAM

(75) Inventor: Tetsuro Inukai, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 1081 days.

(21) Appl. No.: 11/553,756

(22) Filed: Oct. 27, 2006

(65) Prior Publication Data

US 2007/0123204 A1    May 31, 2007

(30) Foreign Application Priority Data

Nov. 7, 2005   (JP) ................................. 2005-321843

(51) Int. Cl.
*H04W 24/00* (2009.01)
*H04W 4/00* (2009.01)
(52) U.S. Cl. .................... 455/456.6; 455/456.1; 455/461
(58) Field of Classification Search .................. 455/461, 455/456.6, 456.1; 707/102, 5; 379/211.01, 379/201.12; 345/753
See application file for complete search history.

(56) References Cited

U.S. PATENT DOCUMENTS

| | | | |
|---|---|---|---|
| 2002/0072917 A1* | 6/2002 | Irvin et al. ................. | 704/270.1 |
| 2002/0180604 A1* | 12/2002 | Yamaashi et al. .......... | 340/573.1 |
| 2003/0004861 A1* | 1/2003 | Amend et al. .................. | 705/37 |
| 2003/0088562 A1* | 5/2003 | Dillon et al. ....................... | 707/5 |
| 2003/0156134 A1* | 8/2003 | Kim .............................. | 345/753 |
| 2003/0158855 A1* | 8/2003 | Farnham et al. .............. | 707/102 |
| 2003/0161451 A1* | 8/2003 | Fitzpatrick et al. ......... | 379/88.22 |
| 2004/0056901 A1 | 3/2004 | March et al. | |
| 2004/0145660 A1* | 7/2004 | Kusaka ....................... | 348/211.2 |
| 2004/0164897 A1* | 8/2004 | Treadwell et al. ............ | 342/358 |
| 2004/0198361 A1* | 10/2004 | Amin .............................. | 455/445 |
| 2004/0203903 A1* | 10/2004 | Wilson et al. .............. | 455/456.1 |
| 2004/0207722 A1* | 10/2004 | Koyama et al. ............ | 348/14.02 |
| 2004/0215551 A1* | 10/2004 | Eder ............................... | 705/38 |
| 2005/0041793 A1* | 2/2005 | Fulton et al. ............. | 379/211.01 |
| 2005/0136949 A1* | 6/2005 | Barnes .......................... | 455/461 |
| 2007/0112508 A1* | 5/2007 | Obradovich et al. ......... | 701/208 |

FOREIGN PATENT DOCUMENTS

| | | |
|---|---|---|
| EP | 1 199 868 A1 | 4/2002 |
| JP | 2002-27085 | 1/2002 |
| JP | 2004-304719 | 10/2004 |
| WO | WO 02/082343 A1 | 10/2002 |

* cited by examiner

*Primary Examiner* — Ahmad F Matar
*Assistant Examiner* — Kharye Pope
(74) *Attorney, Agent, or Firm* — Oblon, Spivak, McClelland, Maier & Neustadt, L.L.P.

(57) ABSTRACT

A communication terminal apparatus includes: a communication unit performing communication; a storage unit collecting and storing history information on communication; a registration unit registering at least communication address information on communicating parties and image information that represents the communicating parties; a display unit displaying images, which represent the registered communicating parties, on a display screen; and an arrangement position determining unit determining arrangement positions of the images, which represent the communicating parties, based on the history information on communication with the communicating parties.

14 Claims, 16 Drawing Sheets

FIG. 3

| No. | NAME | PHONETIC TRANSCRIPTION | SEX | TEL No. | MAIL ADDRESS | AVATAR IMAGE | NICKNAME | LEVEL OF FAMILIARITY | RANK |
|---|---|---|---|---|---|---|---|---|---|
| 001 | | | | | | | | | |
| 002 | | | | | | | | | |
| ... | ... | ... | ... | ... | ... | ... | ... | ... | ... |

300

FIG. 4A
MAIL RECEPTION HISTORY INFORMATION 310

| No. | DATE/TIME | SENDER | TITLE | TEXT | ATTACHED DATA |
|-----|-----------|--------|-------|------|---------------|
| 001 | | | | | |
| 002 | | | | | |
| ⋮ | ⋮ | ⋮ | ⋮ | ⋮ | ⋮ |

FIG. 4B
MAIL TRANSMISSION HISTORY INFORMATION 320

| No. | DATE/TIME | RECIPIENT | TITLE | TEXT | ATTACHED DATA |
|-----|-----------|-----------|-------|------|---------------|
| 001 | | | | | |
| 002 | | | | | |
| ⋮ | ⋮ | ⋮ | ⋮ | ⋮ | ⋮ |

FIG. 5A
INCOMING PHONE CALL HISTORY INFORMATION 410

| No. | DATE/TIME | CALLER | CALL DURATION |
|-----|-----------|--------|---------------|
| 001 | | | |
| 002 | | | |
| ⋮ | ⋮ | ⋮ | ⋮ |

FIG. 5B
OUTGOING PHONE CALL HISTORY INFORMATION 420

| No. | DATE/TIME | CALLED PARTY | CALL DURATION |
|-----|-----------|--------------|---------------|
| 001 | | | |
| 002 | | | |
| ⋮ | ⋮ | ⋮ | ⋮ |

FIG. 13

| NICKNAME | SELECTION CONDITION | |
| --- | --- | --- |
| | SEX | STATISTICAL DATA |
| FORMER GIRL FRIEND | OPPOSITE SEX ∧ FEMALE | NICKNAME IN PREVIOUS RANK IS "GIRL FRIEND" |
| FORMER BOY FRIEND | OPPOSITE SEX ∧ MALE | NICKNAME IN PREVIOUS RANK IS "BOY FRIEND" |
| NEW FRIEND | OPPOSITE SEX | HIGH INCREASE IN LEVEL OF FAMILIARITY |
| LOVER CANDIDATE | OPPOSITE SEX | |
| ONE-WAY LOVE | OPPOSITE SEX | MANY PICTORIAL SYMBOLS ARE USED. MANY CALLS ARE MADE BUT FEWER CALLS ARE RECEIVED |
| ONE-SIDED LOVE | OPPOSITE SEX | |
| HEAD OVER HEELS | OPPOSITE SEX | |
| ⋮ | ⋮ | ⋮ |
| PLAYMATE | COMMON | MORE CALLS AND MAILS ARE SENT AND RECEIVED IN THE EVENING AND NIGHT |
| DRINKING MATE | COMMON | |
| CO-WORKER | COMMON | MORE CALLS AND MAILS ARE SENT AND RECEIVED IN THE DAYTIME |
| CLASSMATE | COMMON | |
| OLD ACQUAINTANCE | COMMON | THIS RANK IS USED FOR A LONG TIME |
| OLD FRIEND | COMMON | |
| EMAIL FRIEND | COMMON | MAILS ARE MUCH MORE THAN PHONE CALLS |
| PEN FRIEND | COMMON | |
| FRIEND | COMMON | OTHERS |
| PAL | COMMON | |

COMMUNICATION TERMINAL APPARATUS AND COMPUTER PROGRAM

BACKGROUND OF THE INVENTION

1. Field of the Invention

The present invention relates to a communication terminal apparatus having a phone directory function and to a computer program running thereon.

2. Description of Related Art

In related art, the phone directory function provided with a portable terminal device, such as a mobile phone, has displayed the information on the registered communicating parties in the list format. The user can select to display the information in order of names or memory numbers or by group.

A method is also proposed for calculating the level of familiarity between the terminal user and the communicating parties using the phone call history and mail history to represent the level of familiarity as histograms or image sizes (see Japanese Patent Application Publication JP2004-304719).

SUMMARY OF THE INVENTION

The list-format phone directories of related art have the following issue in any display format. That is, the friends/acquaintances in the phone directory list with which the user frequently communicates are not always displayed in an easy-to-find position. For example, when the phone directory is arranged in order of names, the entries are arranged alphabetically and so the persons with whom the user communicates frequently are not always among the top entries. Especially, when there are many registrants, it requires time and cumbersome operations to find a desired entry. When the phone list is arranged in order of memory numbers, the user can solve this issue in some degree by taking the memory numbers into consideration when making the list. However, even in this method, the user must manage the memory numbers and, in addition, finds it difficult to dynamically change the list that is already created. Another issue is that the user interface (UI), which displays the names in the list, displays all phone directory entries in the same format. This display format is not easy to intuitively find a desired entry and lacks entertainment value.

The method disclosed in Japanese Patent Application Publication JP2004-304719 given above, which simply displays the level of familiarity in an easy-to-understand format, is not used frequently with the result that the information is not fully utilized.

In view of the foregoing, it is desirable to provide a method for determining display positions of images, each representing a phone directory entry, according to history information on communication between communicating parties and the user, thereby making frequently accessing communicating parties easy to access.

A communication terminal apparatus according to an embodiment of the present invention includes communication means for performing communication; storage means for collecting and storing history information on communication; registration means for registering at least communication address information on communicating parties and image information that represents the communicating parties; display means for displaying images, which represent the registered communicating parties, on a display screen; and arrangement position determination means for determining arrangement positions of the images, which represent the communicating parties, based on the history information on communication with the communicating parties.

The arrangement position of an image representing each communicating party in this configuration is determined based on the history information on communication with that communicating party. For example, the image representing a communicating party, with which communication is made more frequently, is placed nearer to the base position on the display screen.

BRIEF DESCRIPTION OF THE DRAWINGS

FIG. 3 is a diagram schematically showing the configuration of a phone directory, stored in the memory of the mobile phone terminal in FIG. 1, in the tabular format;

FIG. 4 is a diagram schematically showing, in the tabular format, mail reception history information (A) and mail transmission history information (B) in an embodiment of the present invention;

FIG. 5 is a diagram schematically showing, in the tabular format, incoming phone call history information (A) and outgoing phone call history information (B) in an embodiment of the present invention;

FIG. 13 is a diagram showing an actual example of a nickname data table that defines nicknames and their selection conditions in an embodiment of the present invention;

DETAILED DESCRIPTION OF EMBODIMENTS

An embodiment of the present invention will be descried below more in detail with reference to the drawings.

Figure 1:
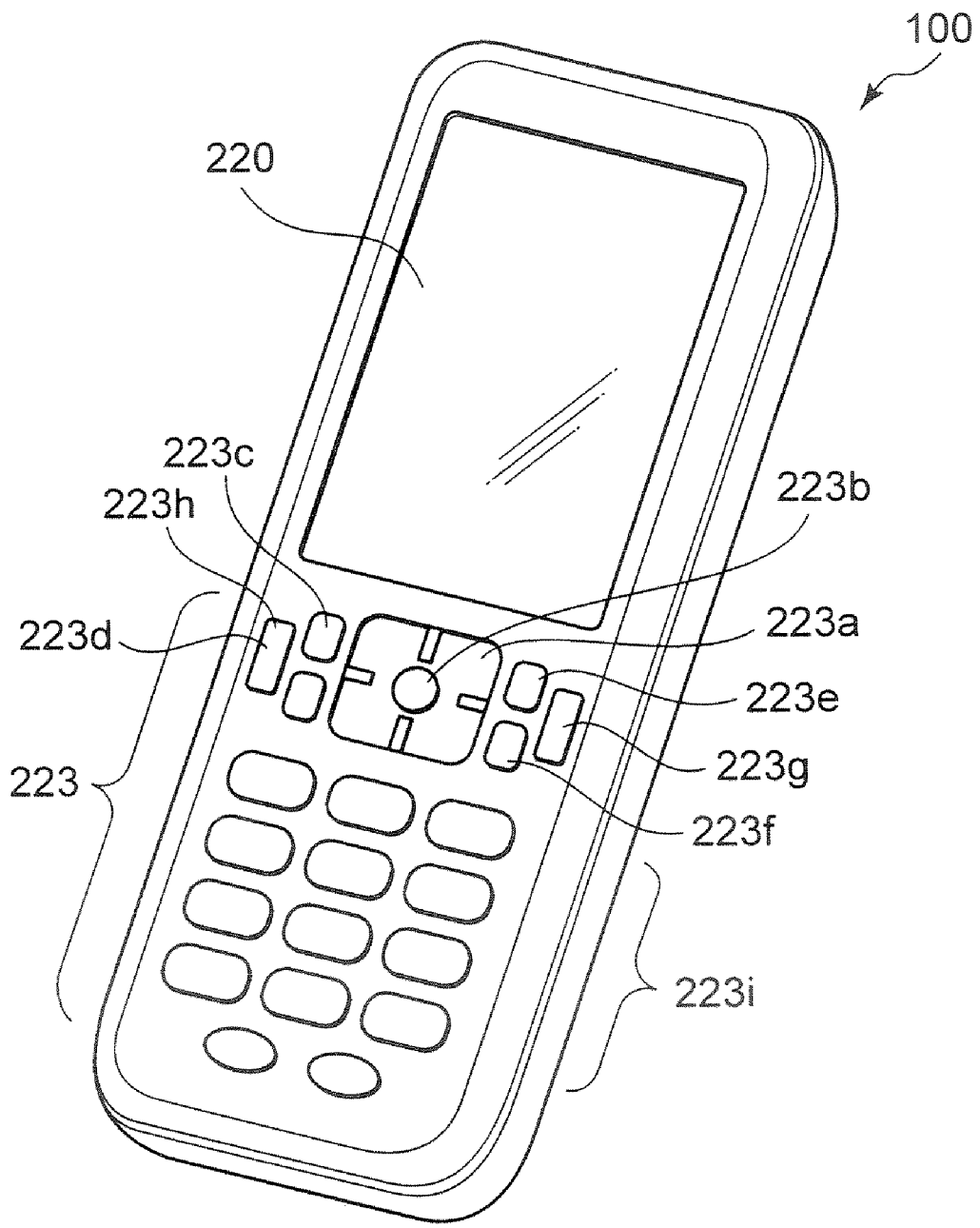
FIG. 1 is a diagram showing the external view of a mobile phone terminal 100 that is an example of a communication terminal apparatus according to the present invention.

FIG. 1 is a diagram showing the external view of a mobile phone terminal 100 that is an example of a communication terminal apparatus according to the present invention. The terminal 100 includes a display unit 220 stored in the phone body and an operation unit 223. The display unit 220, a user interface for providing various types of visual information to the user, typically includes a display device such as a liquid crystal display or an organic electroluminescence display. The operation unit 223, a user interface through which the user enters instructions or information, typically includes various keys (pushbuttons) such as a cursor movement key 223a that moves the cursor in the up, down, right, and left directions, a selection key 223b, soft keys 223c-223f to which various operations are assigned, one for each, a power key 223g, a send key 223h, and keys (ten-key pad) 223i used to enter characters, numbers, and symbols. The present invention relates to the display format of a phone directory displayed on the display screen of the display unit 220. In this specification, phone numbers and mail addresses are generically called communication addresses. The "phone directory" contains data, which associates communication addresses with personal information on the communicating parties for management, is called not only a phone directory but also an address directory.

Figure 2:
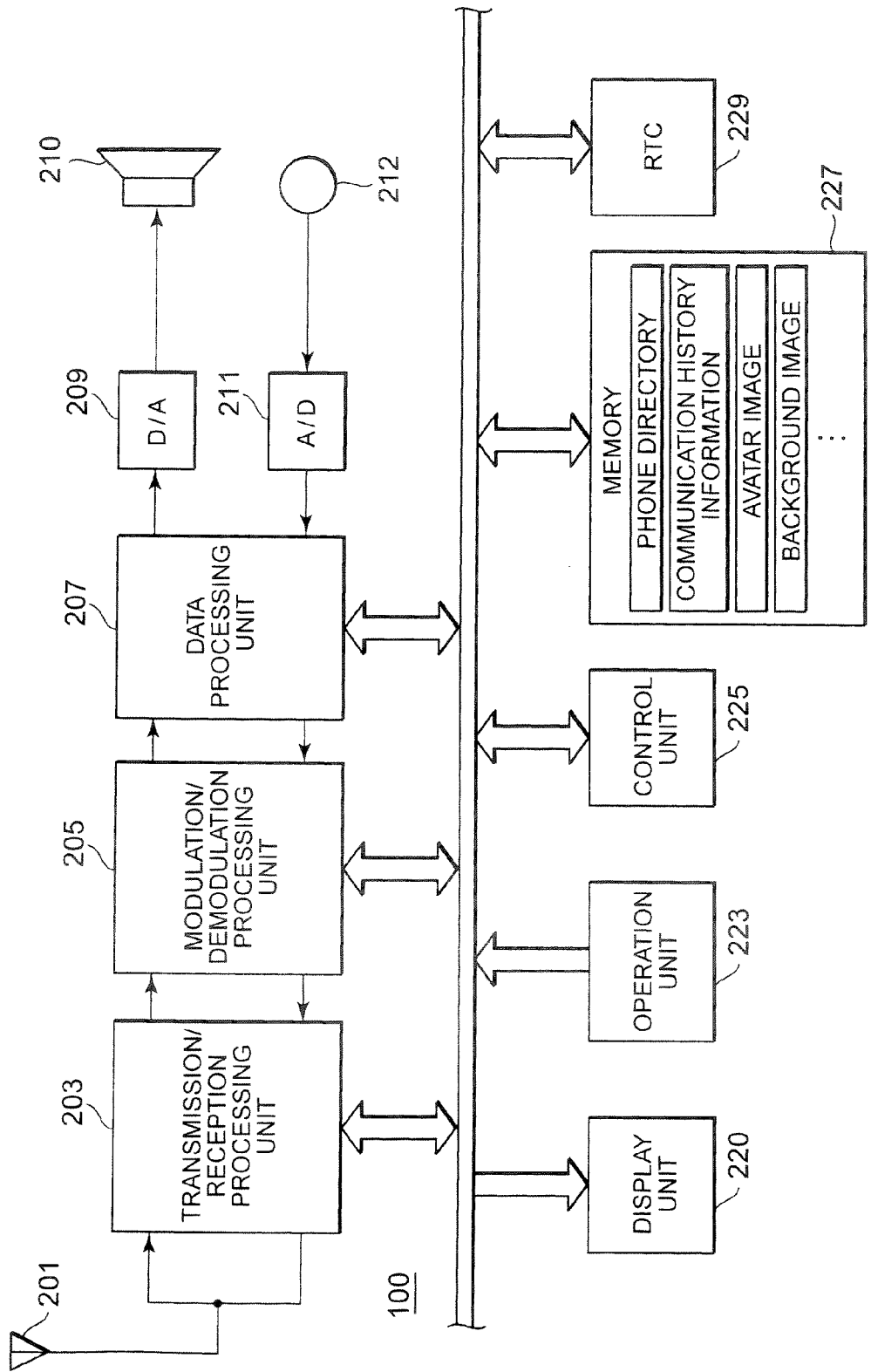
FIG. 2 is a diagram showing the internal hardware configuration of the mobile phone terminal in FIG. 1.

FIG. 2 is a diagram showing the internal hardware configuration of the mobile phone terminal 100 in FIG. 1. This mobile phone terminal 100 includes the following elements specific to a mobile phone: an antenna 201, a transmission/reception processing unit 203, a modulation/demodulation processing unit 205, a data processing unit 207, a D/A converter 209, a speaker 210, an A/D converter 211, and a microphone 212. The mobile phone terminal 100 further includes a control unit 225 including a CPU and a ROM that control the elements described above, a memory 227 used by the control unit 225 as a work area or a data temporary storage area, the display unit 220, the operation unit 223, and an RTC (Real Time Clock) 229. There may be multiple speakers 210, one for a phone call and the other for a ring tone. The ROM of the control unit 225, composed of a read-only memory or an electrically erasable programmable ROM (EEPROM) to or from which information can be electrically written or erased, stores control programs for various types of ordinary mobile phone, such as the acceptance of an operation input, communication, e-mail processing, web processing, display, voice input/output, phone directory management, and schedule management. The ROM also stores fixed data. In this embodiment, e-mail is also referred simply to mail. The memory 227 stores various types of data including a phone directory, communication history information, avatar images, and background images. The RTC (Real Time Clock) 229 is a block that provides the date/time management or the timer function.

FIG. 3 is a diagram schematically showing the configuration of a phone directory 300, stored in the memory 227 of the mobile phone terminal 100, in the tabular format. The phone directory 300 stores user-specified personal information on the communicating parties including "Name", "Phonetic transcription", "Sex", "TELNo. (phonenumber)", "Mail address", "Avatar image", and "Nickname". The phone directory may also store personal information such as the address, birthday, hobby, and constellation. Serial numbers are assigned to the registrant records in order of registration. "Name", "Phonetic transcription", "TEL No.", "Mail address", and "Avatar image" are stored when a communicating party is registered in the phone directory 300. "Nickname", "Level of familiarity", and "Rank" are decided afterwards and stored later (some are once stored and then changed later). The user selects one of pre-stored "Avatar images" Alternatively, the user may use a picture image that can be registered in the phone directory. The size of a picture image, if different from the predetermined size of the avatar image, may be changed as necessary.

The phone directory in this embodiment also stores information on the owner of the mobile phone terminal 100. Alternatively, the user information may also be stored in a recording area different from the area where the phone directory is stored.

FIGS. 4A and 4B are diagrams schematically showing mail reception history information 310 and mail transmission history information 320 in tabular format. The mail reception history information 310 includes the reception "Date/time", "Sender (display name)", "Title", "Text", and "Attached data" of each received mail, and the records are managed with serial number attached in order of reception. The "Sender" column contains the registered name if the sender of the mail is registered in the phone directory, and the display name or the mail address included in the mail if the sender is not registered in the phone directory. It is also possible to detect and manage the occurrences (or occurrence ratio) of pictorial symbols such as the heart mark, not shown, in the received character string for use as information to determine the condition for assigning the nickname that will be described later.

The mail transmission history information 320 includes the transmission "Date/time", "Recipient", "Title", "Text", and "Attached data" of each transmitted mail, and the transmitted records composed of those items are managed with serial number attached in order of transmission. The "Recipient" column contains the registered name of the registrant if the recipient of the mail is registered in the phone directory, and the mail address if the recipient is not registered in the phone directory.

FIGS. 5A and 5B are diagrams schematically showing incoming phone call history information 410 and outgoing phone call history information 420 in tabular format. The incoming phone call history information 410 includes the reception "Date/time", "Caller", and "Call duration" of each incoming call, and the records are managed with serial number attached in order of call reception. The "Caller" column contains the registered name of a phone caller if the phone caller is registered in the phone directory, and the phone number if the phone caller is not registered in the phone directory.

The outgoing phone call history information 420 includes the call "Date/time", "Called party", and "Call duration" of each outgoing call, and the records are managed with serial number attached in order of calling. The "Called party" column contains the registered name of a called party if the called party is registered in the phone directory, and the phone number of the called party if the called party is not registered in the phone directory.

The following describes the operation of this embodiment. Although both a phone and mail are used primarily as examples of communication in the description below, it is also possible to use only communication history information on a telephone only or mail only.

FIGS. 6-11 show display examples of a phone directory screen in this embodiment.

Figure 6:
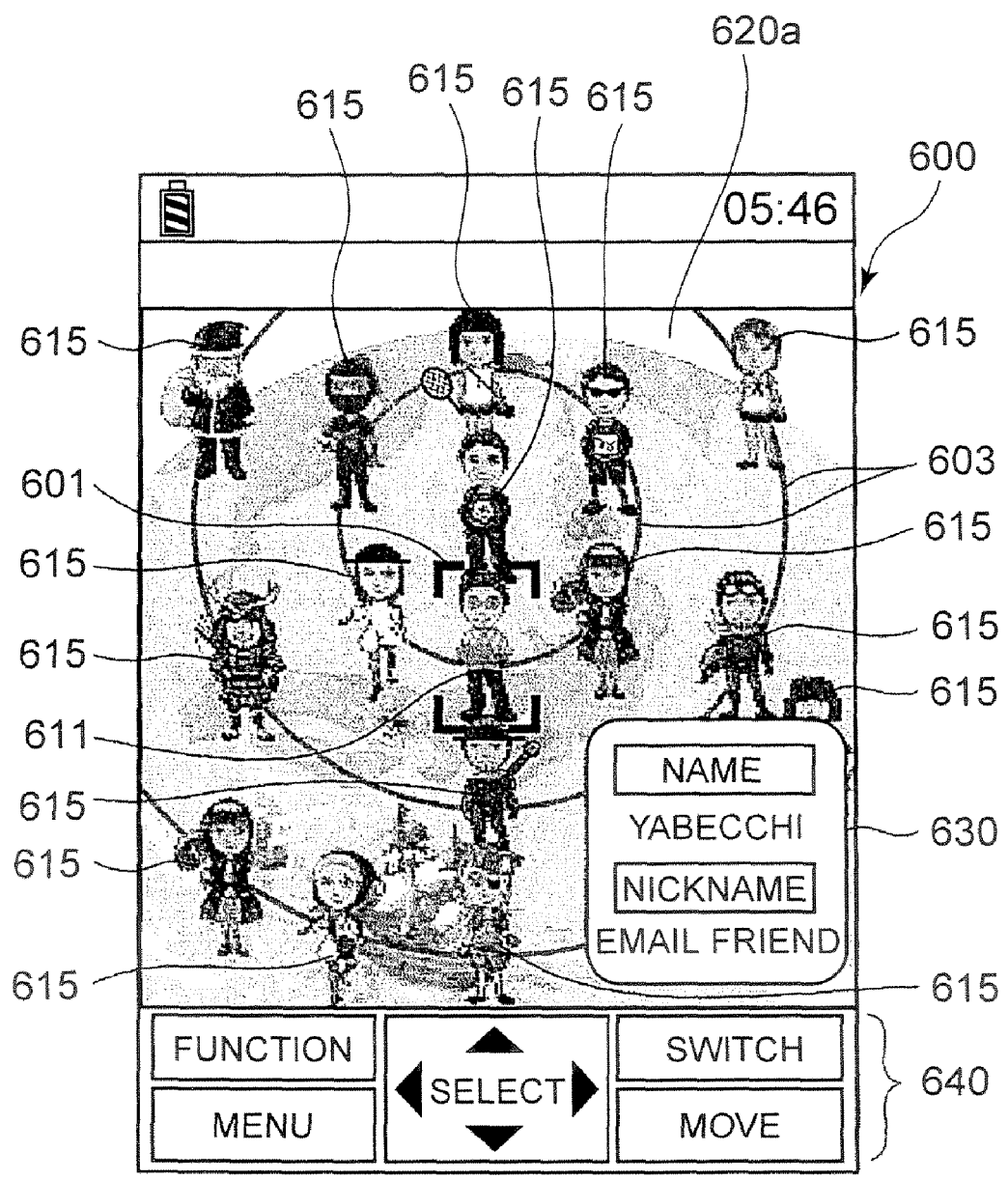
FIG. 6 is a diagram showing an example of the display of a phone directory screen in an embodiment of the present invention.

As shown in FIG. 6, a phone directory screen 600 in this embodiment is displayed in the map format, instead of the list format of related art, where the avatars of communicating parties are arranged on the concentric circles with the user's avatar in the center An avatar is a user s own graphical representation in the virtual world. In this embodiment, a unique image is assigned to the user himself or herself and to each of user's communicating parties.

The phone directory screen 600 has a text display area 630 where the "Name" and "Nickname" of a person (phone owner or communicating party), corresponding to the avatar currently specified by a cursor 601, are displayed. The information in this area helps to confirm the communicating party represented by an avatar. Instead of displaying the text display area 630, only the text information may also be superimposed on the background near an avatar. For all avatars on the phone directory screen 600, it is also possible to always display the name and nickname of an avatar near its image. Because the display of the name and nickname of an avatar image requires a display space, a mixed mode may also be used in which the name and nickname are displayed near the avatar image until a predetermined number of communicating parties is exceeded for each rank and, after the predetermined number is exceeded, the display is switched to the text display area 630.

The arrangement position in the map, where an avatar 615 of a communicating party is arranged, is determined by the level of familiarity calculated by digitizing the number and length of mails and phone calls. The level of familiarity, which is initially 0, is sequentially raised to the next higher rank each time a predetermined value is exceeded. The communicating parties at the same rank are arranged on the same circle. A communicating party with a higher level of familiarity is arranged on an inner circle. It is also possible to determine the arrangement positions of the communicating parties at the same rank according to the level of familiarity. For example, a position to which the cursor can be moved to the home position more easily is assigned to a higher level of familiarity.

In this embodiment, the focus in the phone directory map, indicated by the cursor 601, is moved to the inside and the outside of a circle by the up/down keys and is moved clockwise and counterclockwise on a circle by the left/right keys. Note that the key assignment is not limited to this assignment.

In this embodiment, the images in the screen 600 are moved so that the cursor 601 remains in the center of the screen. Instead of this, the cursor 601 may also be moved, in which case the images are moved after the cursor 601 reaches one of the ends of the screen. In either case, it is preferable that the home button be provided as a soft key or a hard key to allow the cursor, which is away from the center of the concentric circles, to return to the center immediately.

When the user selects a displayed avatar image, the detailed information on the selected communicating party is displayed. This personal information is displayed in the list format as in the related art method. The information may be corrected or deleted.

The information on the phone owner is also displayed if its avatar is selected (normally, data on the phone owner is not included in the phone directory of related art).

Figure 7:
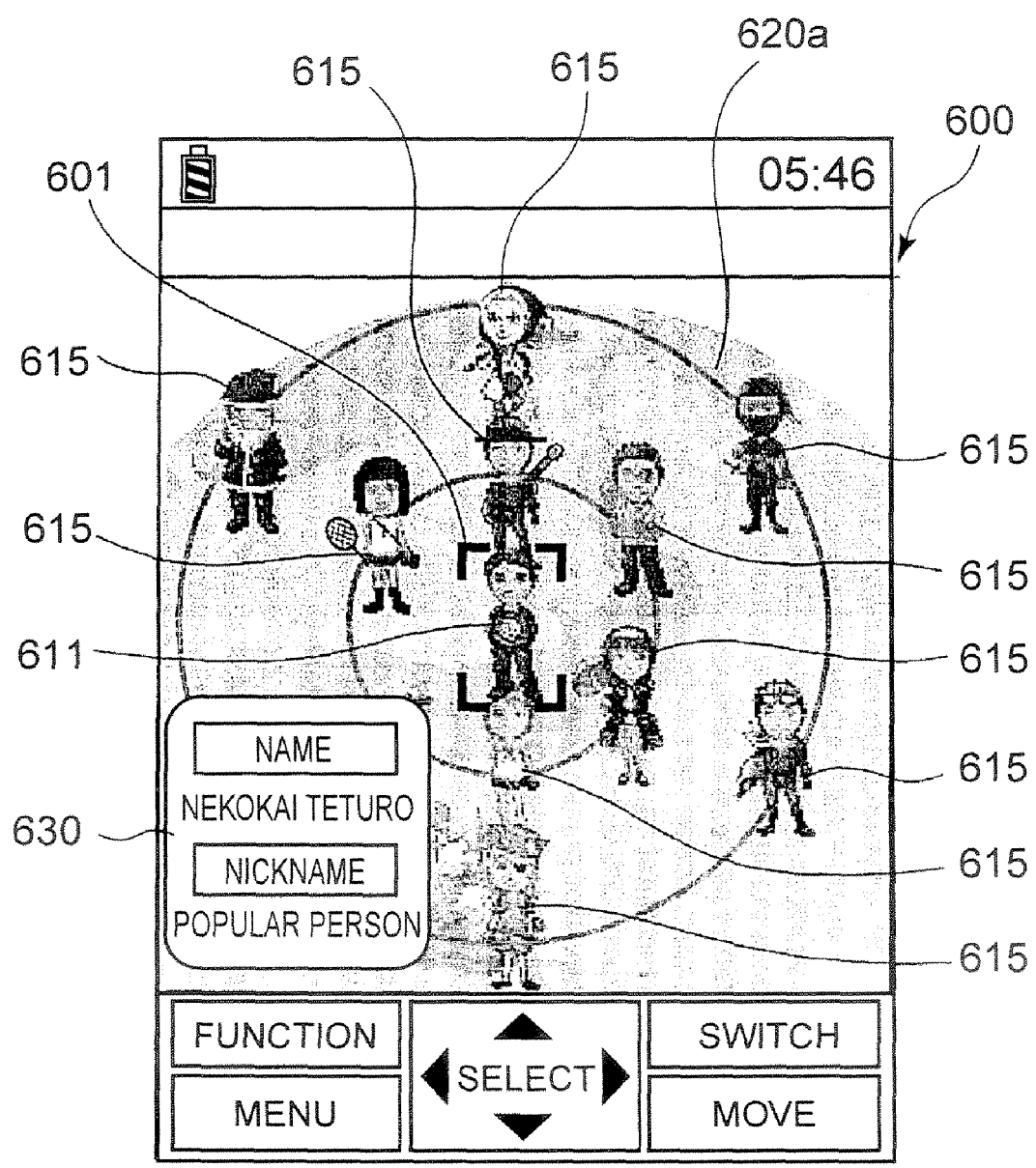
FIG. 7 is a diagram showing an example of the display of the phone directory screen in an embodiment of the present invention.
Figure 8:
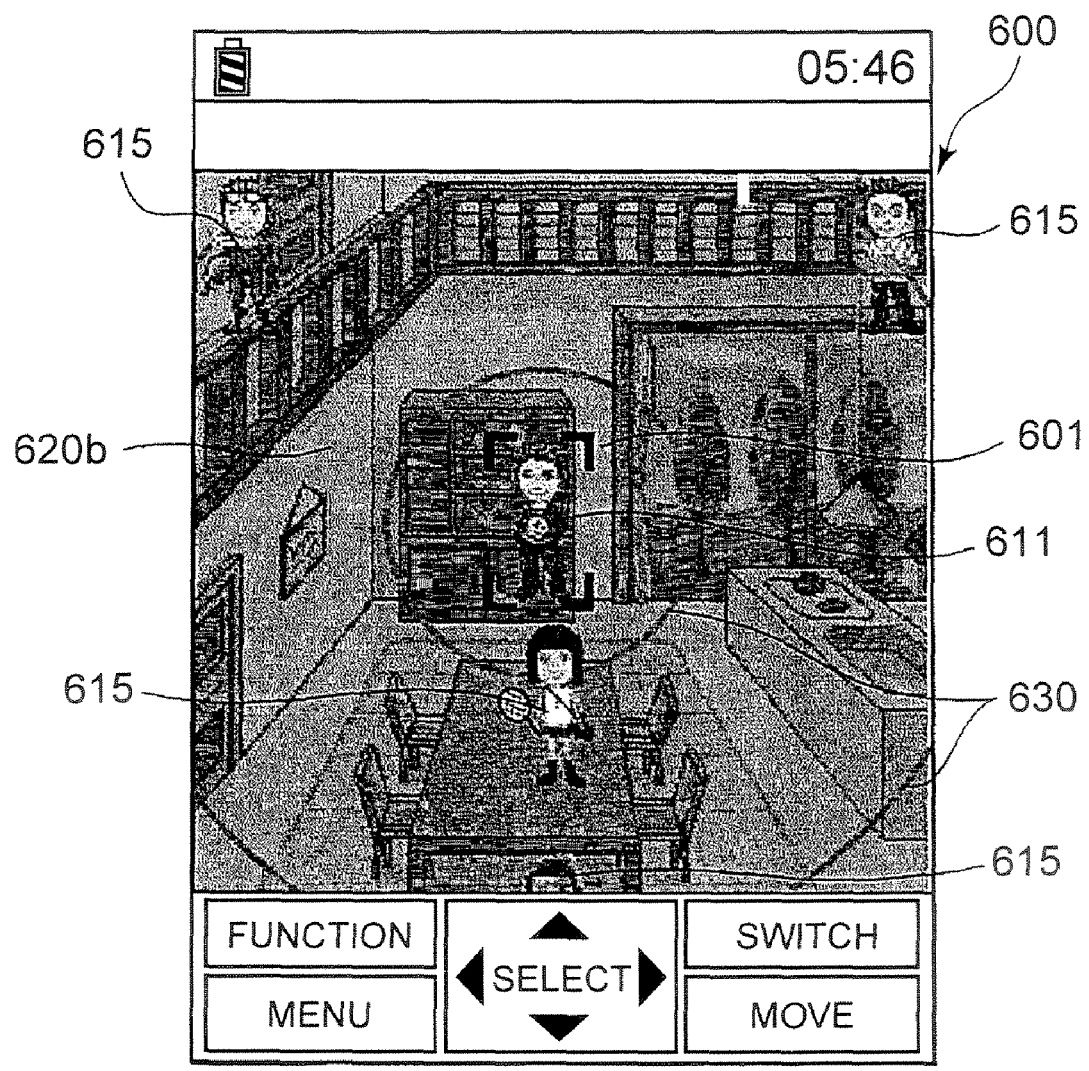
FIG. 8 is a diagram showing an example of the display of the phone directory screen in an embodiment of the present invention.
Figure 9:
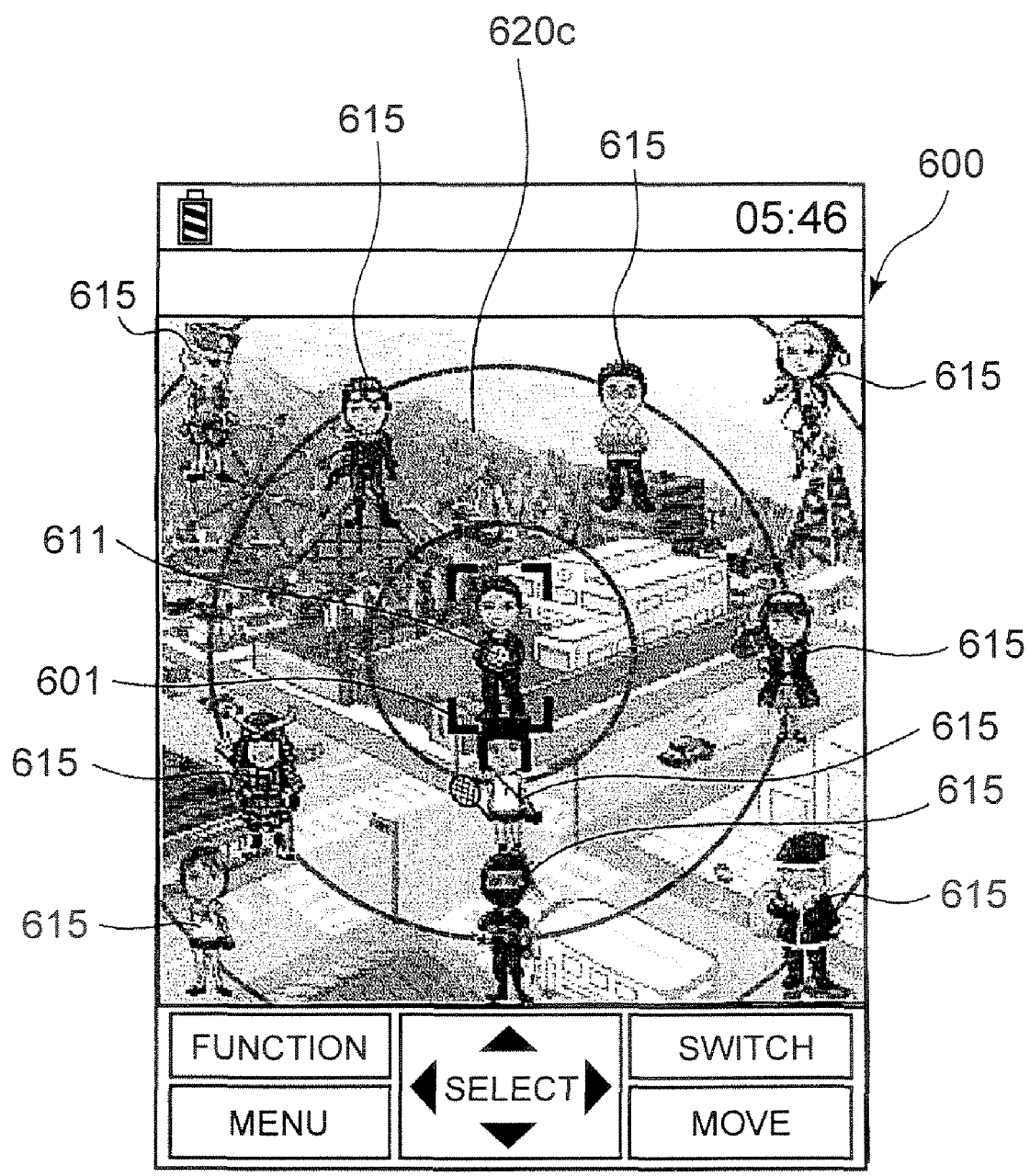
FIG. 9 is a diagram showing an example of the display of the phone directory screen in an embodiment of the present invention.
Figure 10:
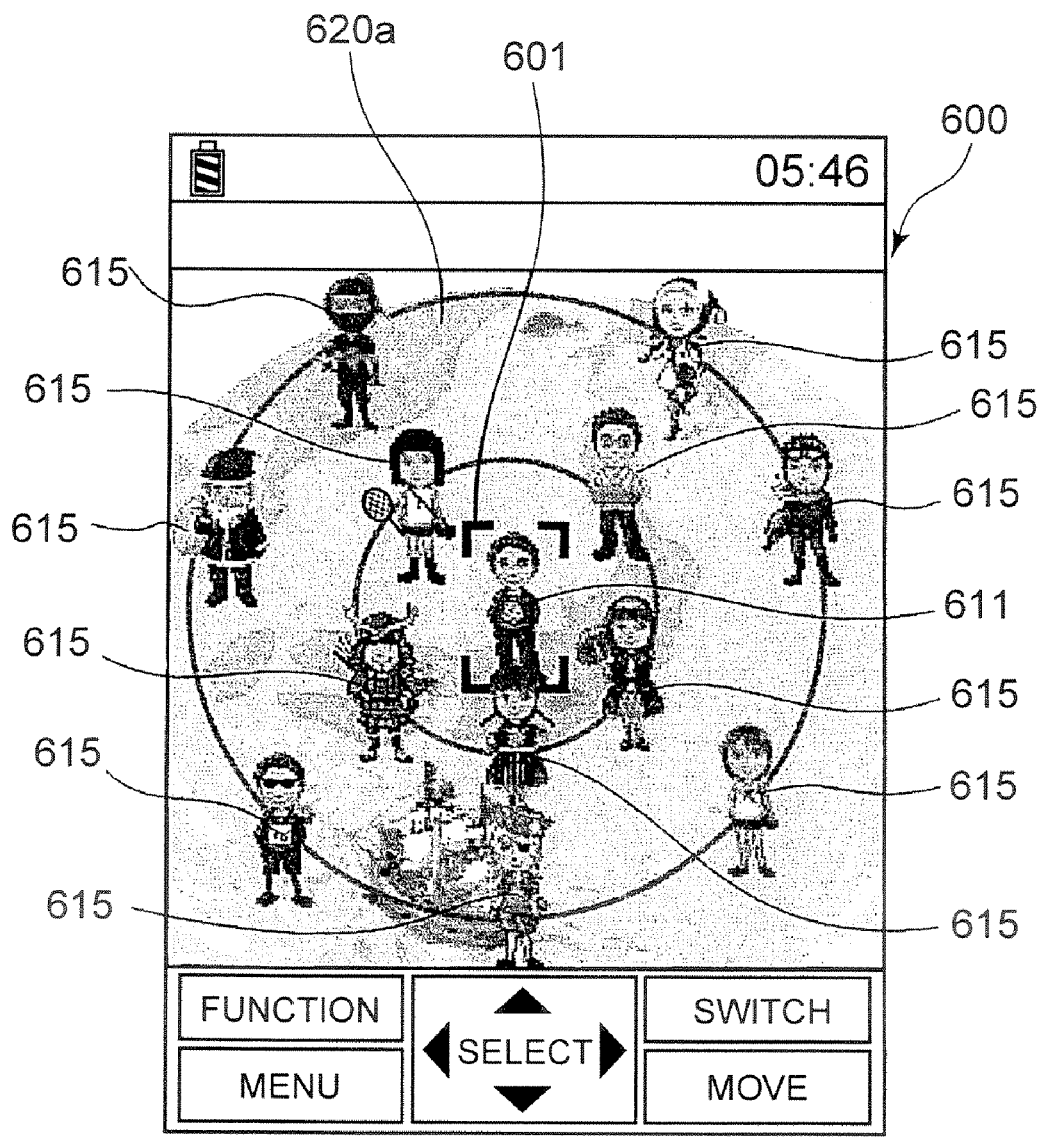
FIG. 10 is a diagram showing an example of the display of the phone directory screen in an embodiment of the present invention.
Figure 11:
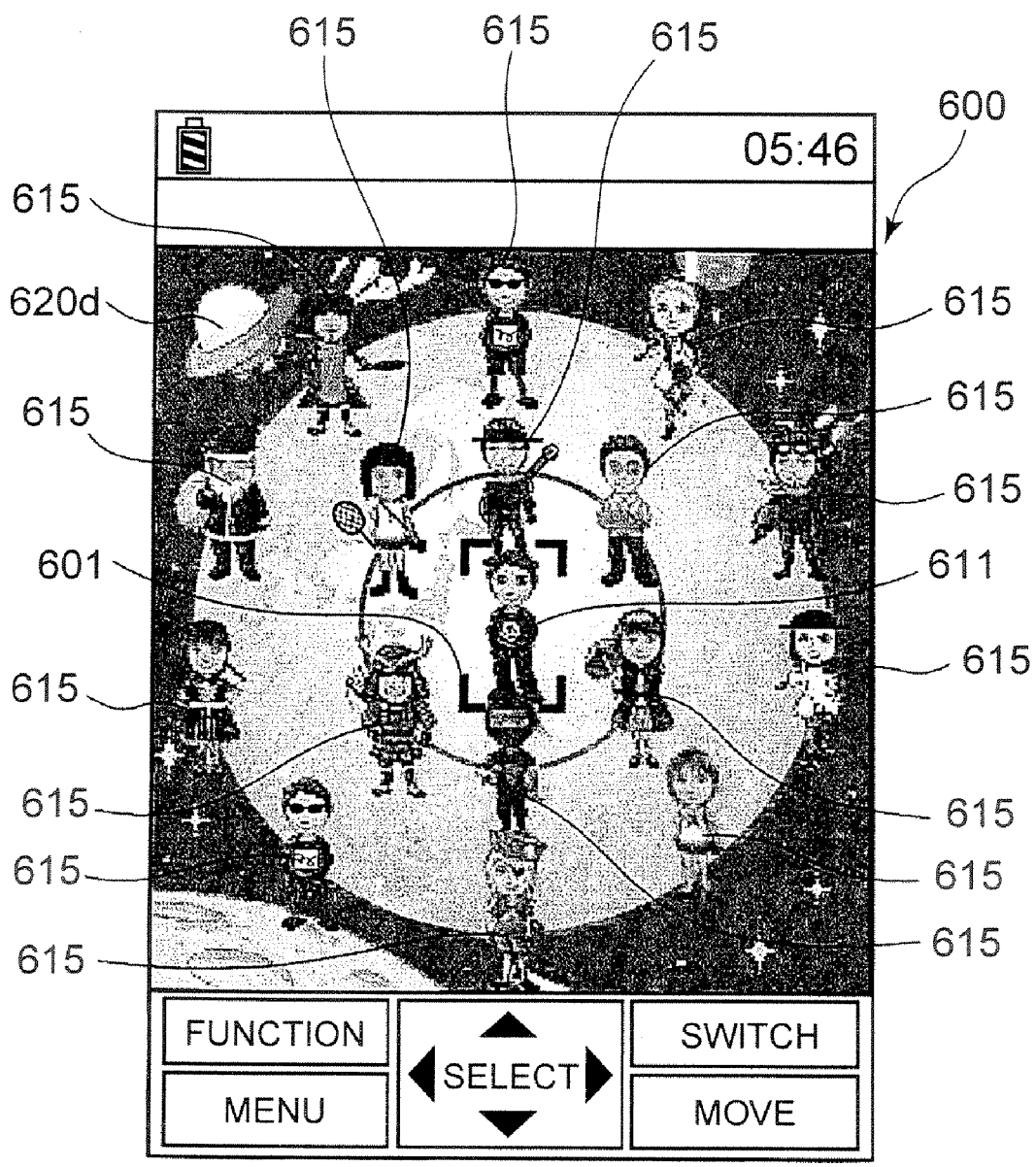
FIG. 11 is a diagram showing an example of the display of the phone directory screen in an embodiment of the present invention.

In this embodiment, a nickname is assigned to each person according to the level of familiarity and the method of communication (determined by the statistical information obtained from communication history information). Multiple nicknames are prepared in advance in this embodiment and, from those nicknames, a suitable nickname is selected and assigned according to the level of familiarity and the method of communication of the person. For example, an "email friend" is assigned to a person whose level of familiarity is high and with whom mail is used for communication in many cases. The popularity of the phone owner is determined by counting the number of communicating parties with the high level of familiarity. As shown in FIG. 7, a nickname may also be assigned to the phone owner based on the popularity of the phone owner (in the example in FIG. 7, the nickname "popular person" is used).

An operation guide 640 is displayed at the bottom of the screen in FIG. 6. The word "Select" in the center and the arrows around "Select" are a guide display corresponding to the operation performed by the cursor movement key 223a provided above the ten-key pad in the operation unit 223 and the selection key 223b provided in the center of the cursor movement key 223a (FIG. 1). "Function", "Menu", "Switch", and "Move" indicate the operations assigned to the soft keys 223c-223f. Operating the cursor movement key 223a moves the cursor 601 from one avatar to another on the phone directory screen 600. The name and the nickname of the person corresponding to the avatar to which the cursor 601 is moved are displayed in the text display area 630. The content of the text display area 630 may be displayed constantly for the avatar to which the cursor 601 is moved or may be displayed upon user request. "Function" is a button for calling the sub-menus of operations such as setting (including the display setting of the phone directory), addition, deletion, and editing. "Menu" is a button for starting the main menu. This button is displayed not only when the phone directory of this embodiment is started but also when the standby screen is displayed or another application is started.

"Switch" is a button for switching the screen between the related art list-format phone directory screen (not shown) and the phone directory screen 600 in this embodiment. While access is made very easily to a high-rank communicating party in the phone directory in this embodiment, access to a low-rank communicating party becomes difficult. To address this issue, this button is provided to allow the user to switch to the list-format phone directory of related art.

"Move" is a button for forcing an avatar to move to another position to change its arrangement position. With this button selected, the user can force the avatar 615 to move from the current arrangement position to another arrangement position using the cursor movement key and the selection key. This button can be used, for example, to force an avatar to move to a specific circle (for example, the outermost circle) of the concentric circles that is defined as a circle for the rejection rank. In this case, the call rejection and/or mail rejection setting is specified for the communicating party represented by the avatar. Using the phone directory map in this way allows the user to specify the call rejection and/or mail rejection setting. At initialization time, the user can specify, in advance, whether one of the call rejection and the mail rejection is set or both of them are set; alternatively, the user can specify that a message be issued to the user when an avatar is moved to the circle corresponding to the rejection rank.

As shown in FIGS. 7-11, the background is changed according to the popularity of the person in the center of the concentric circles, that is, the user of the terminal. In this example, the scale of the image in the background becomes larger as the popularity increases. The popularity of the user is determined, for example, by counting the number of persons in each rank. Weighting may also be applied to the ranks. In this embodiment, the following background images are available: a background image 620b representing a room, a background image 620c representing a street, a background image 620a representing the world, and a background image 620d representing the universe. The text display area 630 can be switched to the display/non-display state via the user operation. The text display area 630 in the phone directory screen in FIGS. 8-11 is in the non-display state.

Figure 12A:
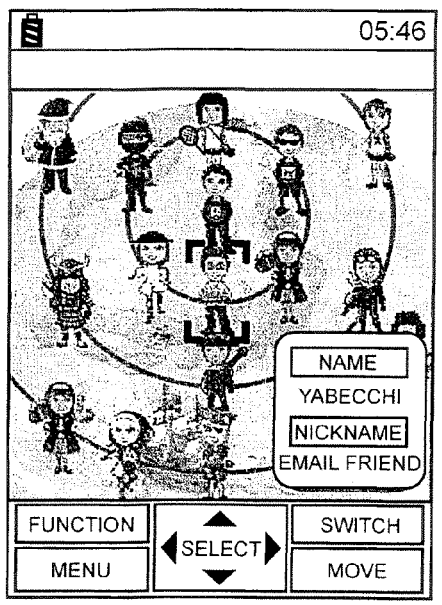
FIG. 12 is a diagram showing the screens to which a transition occurs from the phone directory screen (phone directory map) in an embodiment of the present invention.
Figure 12B:
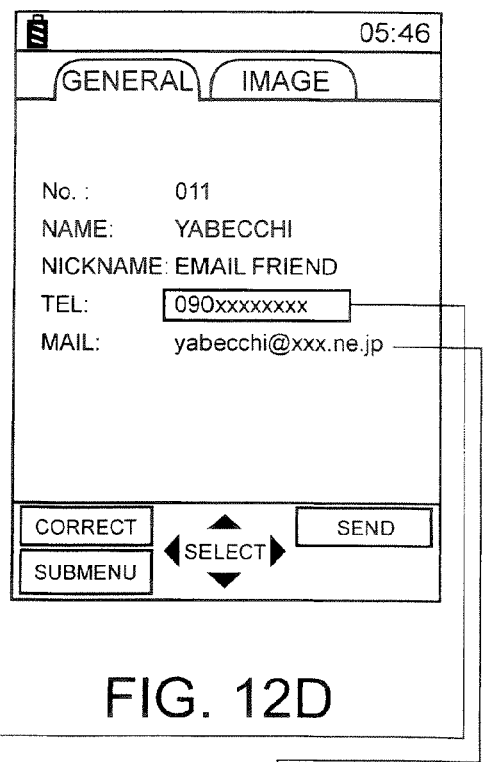
Figure 12C:
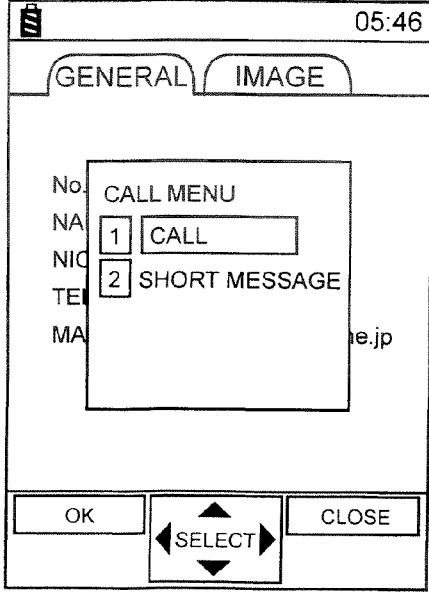
Figure 12D:
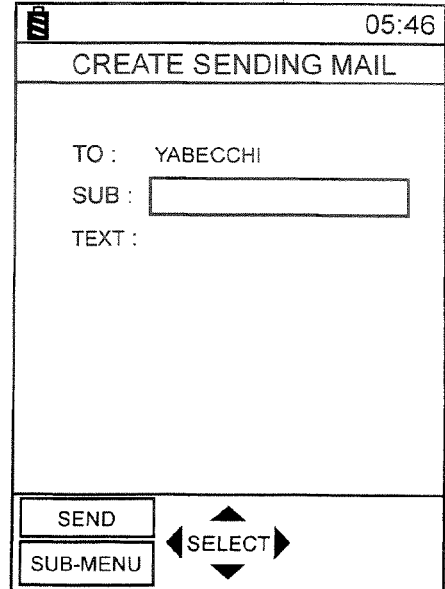

FIG. 12A is a diagram showing the phone directory screen (phone directory map) shown in FIG. 6. The user can select the communicating party, currently specified by the cursor, from this phone directory screen to confirm the detailed registered information on the communicating party registered in the phone directory as shown in FIG. 12B. The user can also confirm the registered image on this screen. The detailed information and the image are obtained by referencing the phone directory 300 shown in FIG. 3. The user can select the phone number from the screen shown in FIG. 12B to correct it or to "Call" the person. When the user selects "Call", the call menu such as the one shown in FIG. 12C is displayed and, from this call menu, the user can move to the phone call screen or the short message creation screen. When the user selects the mail address in the screen shown in FIG. 12B, the sending mail creation screen such as the one shown in FIG. 12D is displayed.

FIG. 13 is a diagram showing an actual example of a nickname data table 700 that defines the nicknames and the selection conditions in this embodiment. The selection conditions in this table define the sexes of the persons and the statistical data on their communication. To create the nickname data table 700, many nicknames are prepared for the ranks of the level of familiarity. The nicknames are classified into several categories in advance according to the similarity in words, for example, "play mates" and "drinking mate", "new friend" and "lover candidate", "one-way love", "one-sided love", and "head over heels". A category that meets a predetermined condition is decided for each person based on the sex and the statistical information obtained from the communication history information (ratio between mail and phone call, time zone of mail and phone call, types and number of pictorial symbols included in mail, ratio between incoming phone calls and outgoing phone calls, ratio between sending mail and receiving mail, phone call response rate, etc.). One of the nicknames of a category is assigned randomly to the person. Although the nickname data table 700 is provided for each rank in this example, the table may be shared among ranks.

Although not shown, a nickname data table may also be provided separately for the owner of the phone because the nickname and the selection condition applicable to the owner of the phone owner differ from those of the others. For example, multiple nicknames, prepared in advance corresponding to the popularity of the owner of the phone, are prepared in the nickname data table (not shown) for the owner of the phone so that the owner of the phone can select a nickname randomly from those nicknames.

Figure 14:
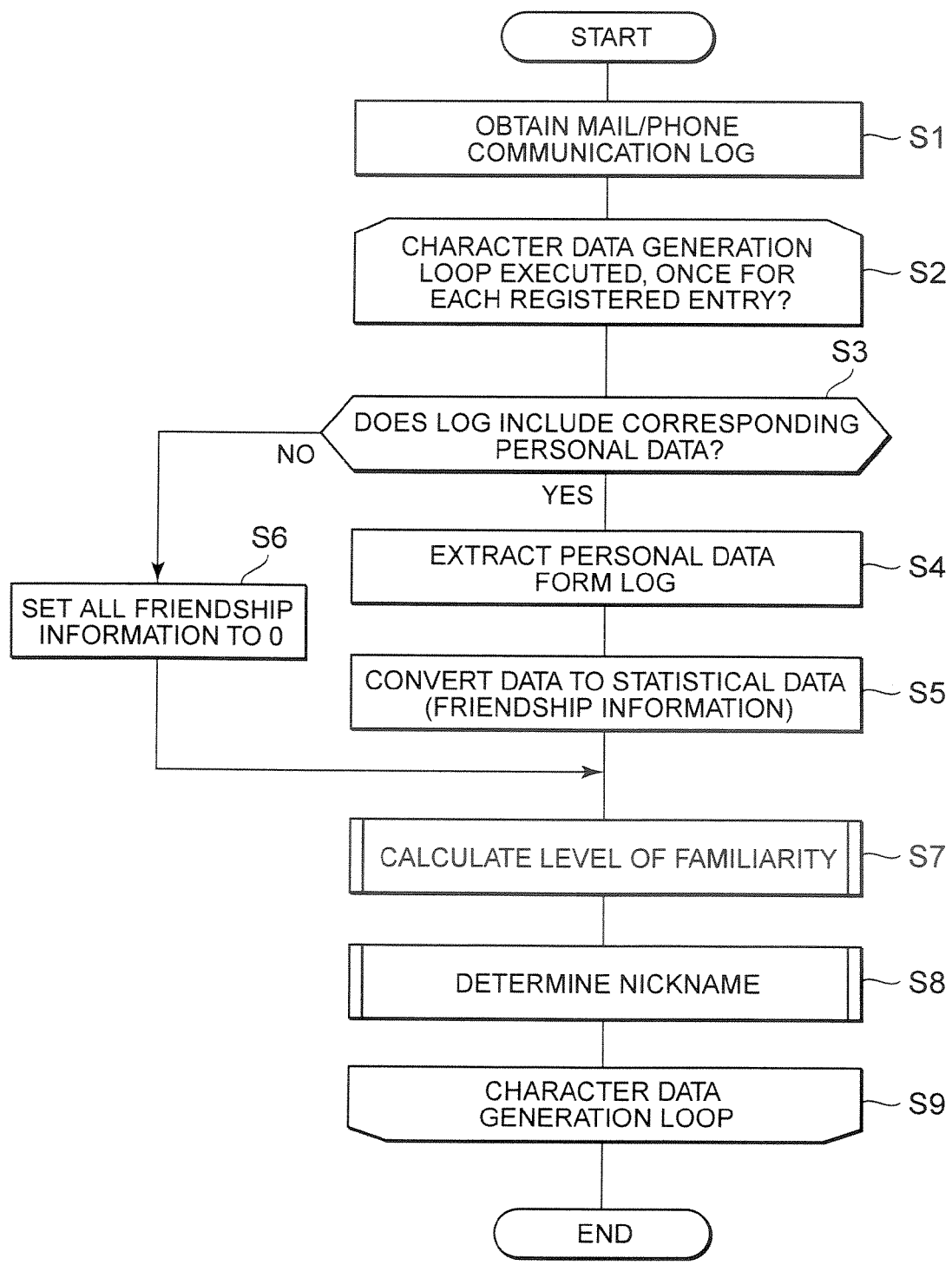
FIG. 14 is a flowchart showing the processing flow for generating character data from the phone/mail communication log in an embodiment of the present invention.

FIG. 14 is a flowchart showing the processing flow for generating character data from the phone/mail communication log. This processing is executed by the terminal upon user request or regularly.

First, the communication terminal apparatus obtains the communication history information (communication log) on the mails and phone calls (S1) such as the one shown in FIGS. 4 and 5. Then, the apparatus executes the character data generation loop described below, one for each entry of the phone directory (for all registrants) (S2-S9). The "character data" refers to the data generated by adding the friendship information, the level of familiarity, and the nickname, obtained based on the statistical data such as the number of phone calls or mails and their lengths, to the personal data recorded in the phone directory.

In the loop, the apparatus first checks if the log obtained in step S1 includes data corresponding to a person registered in the phone directory (S3). If there is corresponding data, the apparatus extracts the data (S4) and generates its statistical data as friendship information (S5). The "friendship information" mentioned here is calculated for a phone call based on the number of calls and the call duration and, for a mail, based on the number of mails and the number of characters in the text. If there is no corresponding data, the apparatus sets all data included in the friendship information to 0 (S6). After that, the apparatus calculates the level of familiarity (S7) based on the friendship information calculated in step S5/S6 and determines the nickname based on the level of familiarity and the friendship information (S8).

Figure 15:
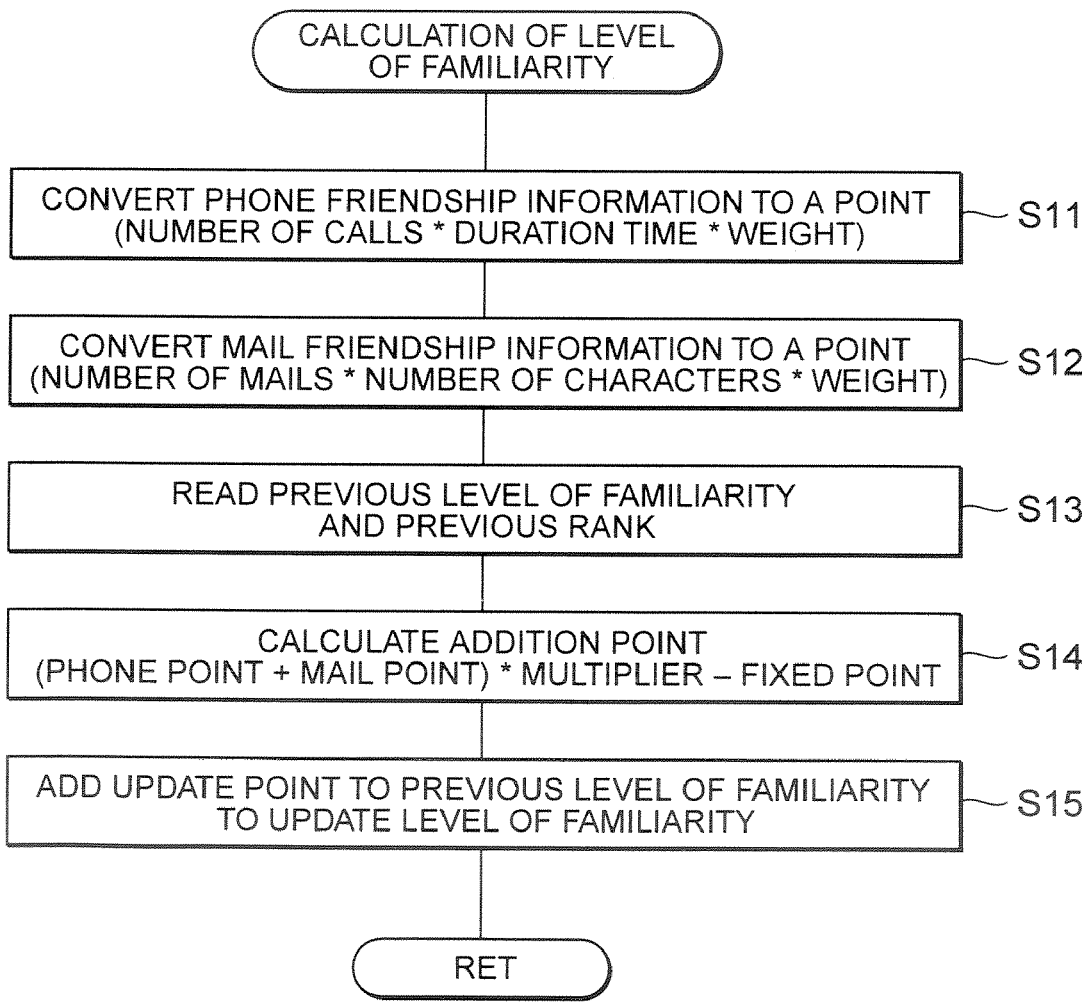
FIG. 15 is a flowchart showing an example of processing for calculating the level of familiarity corresponding to the processing in step S7 in FIG. 14.

FIG. 15 is a flowchart showing an example of processing for calculating the level of familiarity corresponding to the processing in step S7 in FIG. 14. First, the communication terminal apparatus converts the phone friendship information to a point based on the history information on phone calls (FIG. 5) (S11). In converting the phone call information to a point, the apparatus not only counts the number of incoming/outgoing calls but also considers the call duration of each incoming/outputting call. In addition, it is also possible to consider the call time zone, the incoming call to outgoing call ratio, the phone response rate, and the cycle. Weighting is also applied considering the balance between one mail and one phone call. For example, a phone call is weighted more than a mail because a mail can be sent more casually. If the weight of one of a mail and a phone call is set to 1 and the weight of the other is set to 0, it is only required to consider the weight of one of them. The user may also specify this weighting.

Next, the apparatus converts the mail friendship information to a point in the same way based on the mail history information (FIG. 4) (S12). That is, the apparatus applies the weight considering the number of sending/receiving mails and the number of characters.

After that, the apparatus reads the previous level of familiarity and the previous rank of the person from the phone directory 300 (S13). Then, using a predetermined calculation expression, the apparatus calculates the addition point (update point) to be added to (or subtracted from) the previous level of familiarity (S14). That is, the apparatus multiples the sum of the points, calculated in steps S11 and S12, by a multiplier that differs according to the rank and, from the resulting product, subtracts a fixed point (score) dependent on the rank. The sign of this addition point may be positive or negative. The "multiplier" is lower as the level of familiarity of the rank is higher. The "fixed point" is higher as the level of familiarity is higher. Setting the multiplier and the fixed point in this way makes it easy for the level of familiarity to increase but difficult to decrease when the rank is low, and makes it difficult for the level of familiarity to increase but easy to decrease when the rank is high. When the points of the mail and the phone call are 0, that is, when no communication is made, the level of familiarity is decreased. The level of familiarity can be maintained at the same level by making some communication. The level of communication can be increased by making more communication.

The update point calculated in this way is added to (or subtracted from) the previous level of familiarity to update the level of familiarity (S15).

Figure 16:
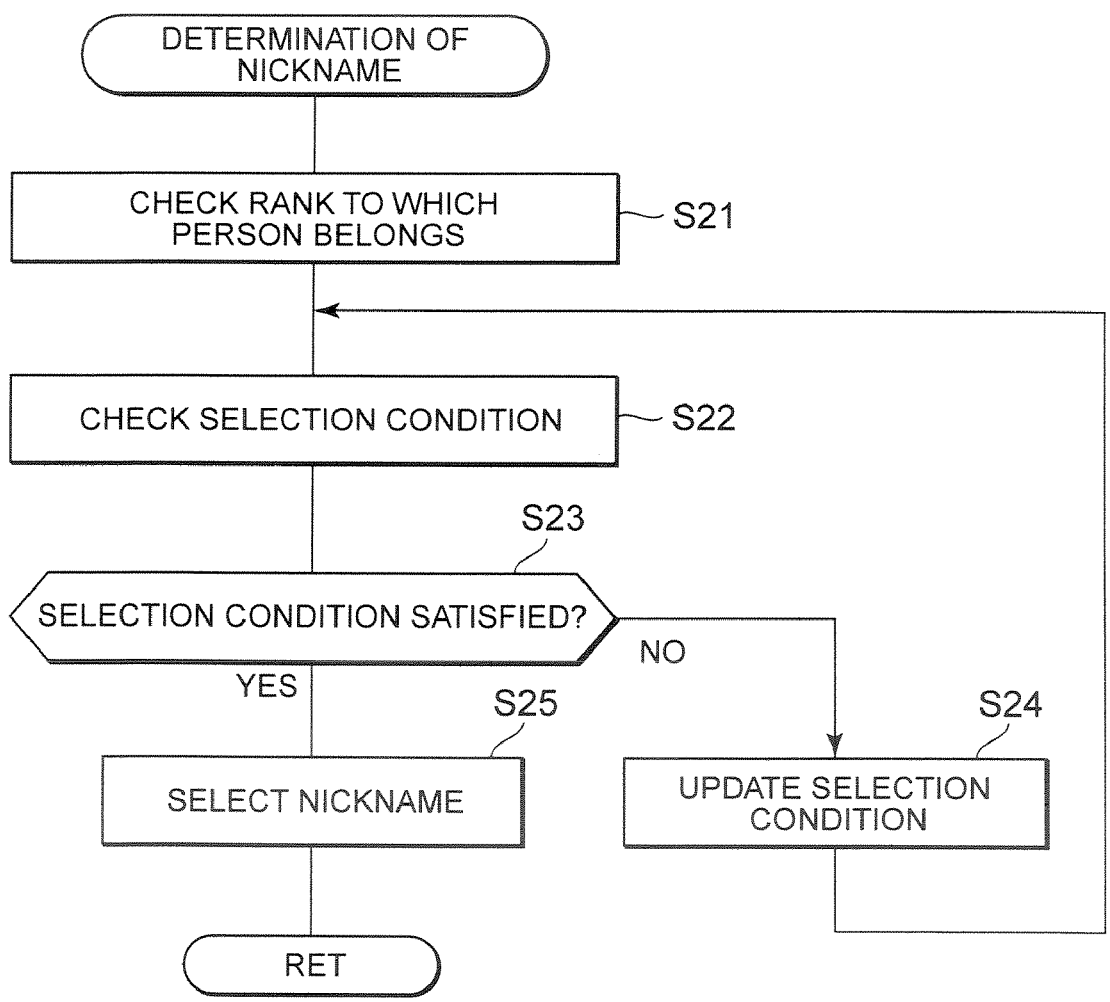
FIG. 16 is a flowchart showing an example of processing for determining the nicknames in step S8 in FIG. 14.

FIG. 16 is a flowchart showing an example of processing for determining the nickname in step S8 in FIG. 14. The following describes a case in which the nickname data table 700 (FIG. 13) is provided for each of the ranks to which the communicating parties registered in the phone directory belong.

First, the communication terminal apparatus checks the rank to which the person currently belongs (S21). To do so, the apparatus references the nickname data table of the rank to check the specified selection condition (S22). The apparatus checks whether the sex of the person and its communication statistical data satisfy the selection condition (S23). If the sex and the communication statistical data do not satisfy the selection condition, the apparatus updates the selection condition (S24) and passes control back to step S22 to repeat the processing described above. If the sex and the communication statistical data satisfy the selection condition, the apparatus selects the nickname corresponding to the selection condition (S25) and terminates the processing.

According to the processing in FIG. 14, the nickname is updated each time the rank of a person is changed from one rank to another. The rank remains the same when the person is classified into the same category of the same rank even if the level of familiarity is changed or the communication method is changed. The nickname is changed if a person belongs to a lower rank and then to a higher rank or if a person is classified into another category of the same rank.

Figure 17:
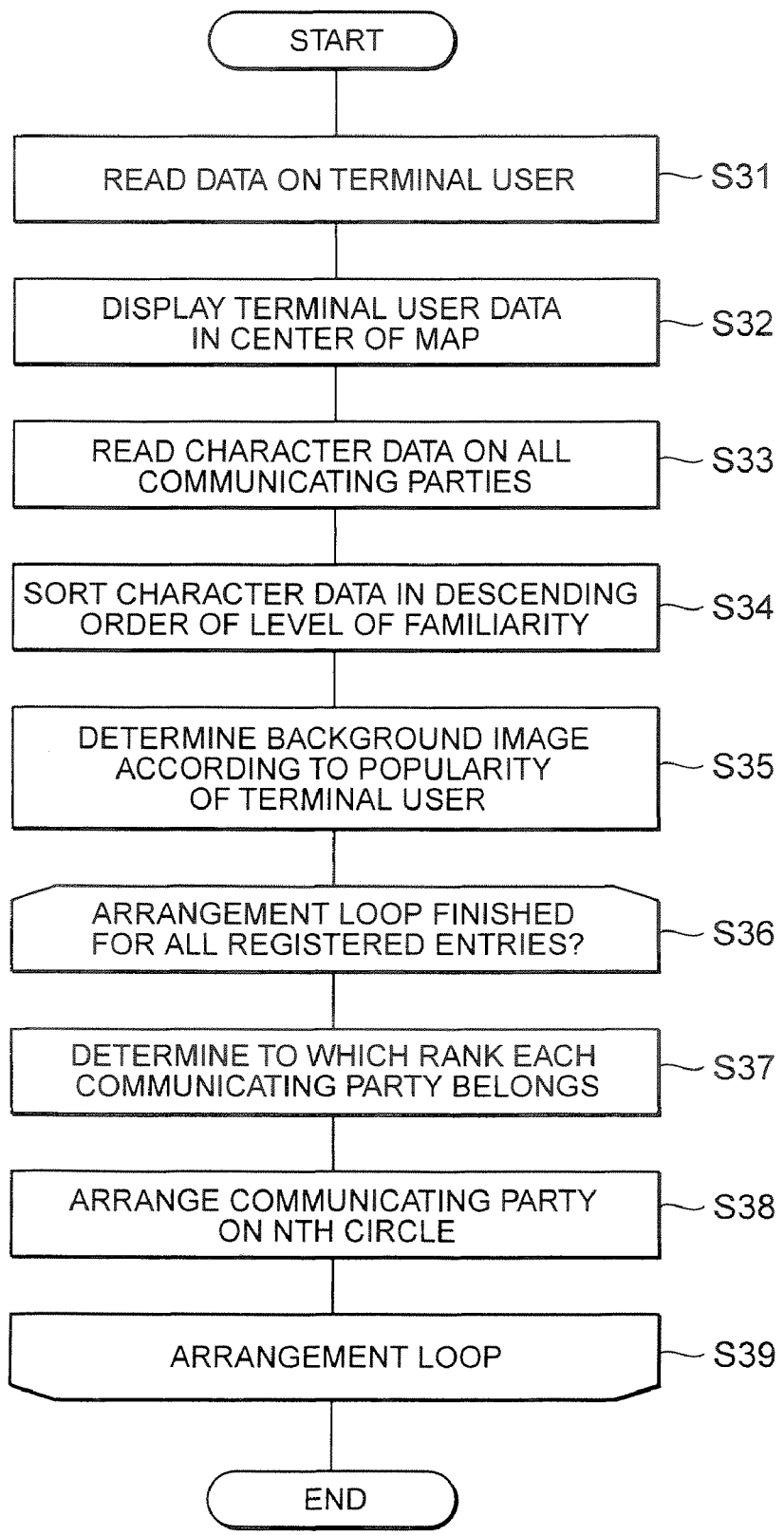
FIG. 17 is a flowchart showing the processing for arranging the avatars on the phone directory map based on the level of familiarity in an embodiment of the present invention.

Finally, FIG. 17 is a flowchart showing the processing for arranging the avatars on the phone directory map based on the level of familiarity. This arrangement result is reflected on the phone directory screen 600 (FIG. 6).

First, the communication terminal apparatus reads data on the user (owner) of the terminal (S31) and arranges the data in the center of the phone directory map, that is, in the center of the concentric circles (S32). After that, the apparatus reads the character data on all communicating parties registered in the phone directory (S33) and sorts the character data, which has been read, in descending order of the level of familiarity (S34). In addition, the apparatus determines the background image according to the popularity of the user and displays the determined background image (S35).

After that, the apparatus executes the following loop processing, once for each registered entry (S36-S39). That is, the apparatus serially determines to which rank each communicating party belongs (S37) More specifically, the device compares the given level of familiarity with multiple predetermined thresholds corresponding to the boundary between any two ranks to determine to which rank each communicating party belongs. After that, the device arranges and displays the communicating party on a predetermined position on the circle of the rank (nth rank) (S38). The predetermined position on the circle means, for example, one of the equally spaced positions on the circle generated according to the number of persons belonging to the same circle.

As the number of registered entries is increased, an ordinary phone directory makes it difficult to search for a person with which communication is made frequently. By contrast, the phone directory in this embodiment displays persons, with which communication is made frequently, near the center of the concentric circles, thus eliminating the step for scrolling the phone directory until the desired communicating party is searched for from many registered entries. That is, the communication terminal apparatus in this embodiment more likely displays a desired person in the first screen, displayed immediately after the phone directory is opened, to enable the user to access the desired person without scrolling.

The device also allows the user to recognize the communication status between the user and the friends, for example, to recognize with which persons the user does or does not frequently communicates recently. That is, the device immediately gives a comprehensive idea of the association with the friends.

Updating the communication history information allows the user to flexibly take actions against the dynamically changing association with the friends.

The apparatus displays the communicating parties using images such as avatars to increase the entertainment value and gives the user much pleasure in using the phone directory.

Although the present invention has been described with reference to the embodiment, it is to be understood that the present invention is not limited to the embodiment but that various modifications and changes may be made.

For example, the avatar of the phone owner is not always required in the phone directory screen but may be omitted.

The size of an avatar image, though fixed in this embodiment, may also be changed according to the total number of communicating parties in the same rank. Alternatively, an avatar image on which the cursor is placed may also be temporarily enlarged. Those capabilities are effective when many avatars are in the same rank.

When the ranking is updated, it is also possible that at least the images displayed in the screen move from the previous positions to the latest positions as animated images. This movement allows the user to trace the change.

The avatars, though positioned on the concentric circles in the embodiment, may be positioned also in any shape, such as a sector, a spiral, or a pyramid, as long as their arrangement positions from the base position are different.

The present invention, advantageously applicable to a mobile phone, may also be applicable to applications running in a personal computer.

Although the total number of ranks is fixed, it is also possible to dynamically change the total number of ranks, for example, when the number of entries of communicating parties increases. In such a case, the number of thresholds of the level of familiarity is also changed.

The communication terminal apparatus in accordance with the present invention determines the display positions of the communicating parties on the display screen, such as the display screen of a phone directory provided with the apparatus, according to the history information on the communication between the communicating parties and the user. This display method makes it easy to access the communicating parties with which the user is likely to communicate. As a result, the present invention provides a communication terminal apparatus easy to operate during communication.

The present application contains subject matter related to Japanese Patent Application JP 2005-321843 filed in the Japanese Patent Office on Nov. 7, 2005, the entire content of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication terminal apparatus comprising:
communication means for performing communication;
storage means for collecting and storing history information on communication;
registration means for registering at least communication address information on communicating parties and image information that represents the communicating parties;
display means for displaying images, which represent the registered communicating parties, on a display screen; and
arrangement position determination means for determining arrangement positions of the images, which represent the communicating parties, based on the history information including numbers of communication times with the communicating parties, wherein
the arrangement position determination means determines a distance between a position, where an image representing a communicating party is displayed, and a base position on the display screen based on a number of communication times with the communicating party.

2. The communication terminal apparatus according to claim 1, wherein:
the arrangement position determination means determines a rank based on a number of communication times with the communicating party, and determines a position on one of concentric circles where the image is displayed, the concentric circles corresponding to a plurality of ranks, one for each circle, with the base position in a center, the concentric circles having different distances from the base position.

3. The communication terminal apparatus according to claim 1, wherein:
the registration means further stores an image representing a user of the communication terminal apparatus; and
the arrangement position determination means arranges an image representing the user in the base position.

4. The communication terminal apparatus according to claim 1, wherein:
a specific rank is used for rejecting a reception of phone calls and/or mails and,
for a communicating party represented by an image moved to the rank, the rejection of the reception of phone calls and/or mails is set.

5. The communication terminal apparatus according to claim 1, wherein:
a plurality of images are prepared in advance for use as a background image that is displayed when the images representing the registered communicating parties are displayed on the display screen;
the communication terminal apparatus further includes:
means for selecting the background image based on a number of communicating parties registered by the registration means.

6. The communication terminal apparatus according to claim 1, further comprising:
means for classifying statistical information on a communicating party into a plurality of categories based on communication history information on the communicating party, for assigning one of nicknames to the communicating party, the nickname being prepared in advance for each category, and for displaying the nickname on the display screen.

7. The communication terminal apparatus according to claim 2, wherein:
a level of familiarity between a communicating party and a user is calculated as the communication frequency based on the communication history information on the communicating party and
the level of familiarity is compared with a predetermined threshold to determine to which rank the communicating party belongs.

8. The communication terminal apparatus according to claim 7, wherein:
if the level of familiarity is updated based on new communication history information on a communicating party, the level of familiarity is updated using a calculation expression that makes it easy for the level of familiarity to increase but difficult to decrease if the rank is low and that makes it difficult for the level of familiarity to increase but easy to decrease if the rank is high.

9. The communication terminal apparatus according to claim 1, further comprising:
means for switching between a screen on which communicating parties are represented by images and a screen on which communicating parties are represented in a list format in response to an instruction from a user.

10. The communication terminal apparatus according to claim 1, wherein:
the display means displays the communication address information on the communicating party in response to an instruction from a user issued to the image of the communicating party.

11. A non-transitory computer-readable medium including a computer program executed by a communication terminal apparatus having at least registration unit configured to register communication address information on communicating parties and image information representing the communicating parties, the computer program causing a computer in the communication terminal apparatus to execute a method comprising:
collecting and storing history information on communication;
displaying images that represent the registered communicating parties on a display screen; and
determining arrangement positions of the images, which represent the communicating parties, at the display time based on the history information including number of communication times with the communicating parties, wherein
determining arrangement positions of the images includes determining a distance between a position, where an image representing a communicating party is displayed, and a base position on the display screen based on a number of communication times with the communicating party.

12. A communication terminal apparatus comprising:
a communication unit performing communication;
a storage unit collecting and storing history information on communication;
a registration unit registering at least communication address information on communicating parties and image information that represents the communicating parties;
a display unit displaying images, which represent the registered communicating parties, on a display screen; and
an arrangement position determining unit determining arrangement positions of the images, which represent the communicating parties, based on the history information including number of communication times with the communicating parties, wherein
the arrangement position determination unit is configured to determine a distance between a position, where an image representing a communicating party is displayed, and a base position on the display screen based on a number of communication times with the communicating party.

13. The non-transitory computer-readable medium according to claim 11, further comprising:
determining a rank based on a number of communication times with the communicating party; and
determining a position on one of concentric circles where the image is displayed, the concentric circles corresponding to a plurality of ranks, one for each circle, with the base position in a center, the concentric circles having different distances from the base position.

14. The communication terminal apparatus according to claim 12, wherein
the arrangement position determination unit is configured to determine a rank based on a number of communication times with the communicating party, and determines a position on one of concentric circles where the image is displayed, the concentric circles corresponding to a plurality of ranks, one for each circle, with the base position in a center, the concentric circles having different distances from the base position.

* * * * *